(12) United States Patent
Nakamura

(10) Patent No.: US 7,131,419 B2
(45) Date of Patent: Nov. 7, 2006

(54) CRANKSHAFT SUPPORTER

(75) Inventor: Makoto Nakamura, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 476 days.

(21) Appl. No.: 10/601,779

(22) Filed: Jun. 23, 2003

(65) Prior Publication Data
US 2004/0000229 A1   Jan. 1, 2004

(30) Foreign Application Priority Data
Jun. 27, 2002   (JP) ............... 2002-187755

(51) Int. Cl.
*F02F 7/00*   (2006.01)
(52) U.S. Cl. .............. 123/195 R; 123/195 H; 92/140
(58) Field of Classification Search ............ 123/195 R, 123/195 H; 92/140
See application file for complete search history.

(56) References Cited

U.S. PATENT DOCUMENTS 6,543,334 B1   4/2003 Yamauchi
6,655,843 B1 *  12/2003 Suzuki ............... 123/195 R
6,942,391 B1 *  9/2005 Nakamura ............ 384/432

FOREIGN PATENT DOCUMENTS

| JP | 2000-337348 | 5/2000 |
|----|-------------|--------|
| JP | 2001-071117 | 3/2001 |
| JP | 2002-061538 | 2/2002 |

\* cited by examiner

Primary Examiner—Tony M. Argenbright
Assistant Examiner—Katrina Harris
(74) Attorney, Agent, or Firm—Flynn, Thiel, Boutell & Tanis, P.C.

(57) ABSTRACT

A crankshaft supporter having a support member which is attached to a cylinder block of an engine so as to support a crankshaft and which is formed of an aluminum alloy matrix with a preform cast inside. The support member includes a mounting surface, bolt holes and a dowel hole. A penetrated section of the preform has a through hole defining the bolt hole. The support member has a recess section formed of the matrix. The recess section is positioned between the mounting surface of the support member and an opposing surface of the penetrated section that faces the mounting surface so as to shape the dowel hole therein.

13 Claims, 6 Drawing Sheets

CRANKSHAFT SUPPORTER

FIELD OF THE INVENTION

This invention relates to crankshaft supporters, and more particularly to a crankshaft supporter which permits an easier cutting process to form a knock-pin (dowel) hole so as to reduce wear of blades of cutting tools.

BACKGROUND OF THE INVENTION

In vehicle engines, a crankshaft is supported in a lower part of a cylinder block by a crankshaft supporter as shown in FIGS. 11 and 12. FIG. 11 shows an engine 102, a cylinder block 104, a crankshaft 106, and a crankshaft supporter 108. The crankshaft supporter 108 includes, in the cylinder block 104, a bearing section 110, mounting sections 112 adjacent the sides of the bearing 110, and outer walls 114 outward of the mounting sections 112.

The bearing section 110 in the cylinder block includes a bearing metal 116. The mounting sections 112 in the cylinder block have bolt screw holes 120 which are opened to a mounting surface 118 of the cylinder block. As shown in FIG. 12, the mounting surface 118 defines therein a knock-pin (dowel) hole 122 that opens to the mounting surface 118 and in coaxial alignment with the bolt screw holes 120.

The crankshaft supporter 108 is mounted to the cylinder block 104 of the engine 102 so as to support the crankshaft 106, and includes a lower crankcase 128 that is formed of aluminum alloy as a matrix 124 and that has a preform (core material) 126 cast (embedded) therein.

The lower crankcase 128 is provided with a bearing section 130 opposed to the bearing section 110 in the cylinder block, mounting sections 132 located adjacent both sides of the bearing section 130 and attached to the mounting sections 112 in the cylinder block, and outer walls 134 outward of the mounting sections 132 to correspond to the outer walls 114 in the cylinder block.

The bearing section 130 in the lower crankcase is equipped with a bearing metal 136 corresponding to the bearing metal 116 in the cylinder block. The mounting sections 132 in the lower crankcase include bolt holes 140 which correspond to the bolt holes 120 and which are opened to a mounting surface 138 of the lower crankcase. A dowel hole 142 opened to the mounting surface 138 is defined in coaxial alignment with the bolt hole 140.

The preform 126 includes a support section 144 that is cast in the bearing section 130, and penetrated sections 146 adjacent both sides of the support section 144 to be cast in the mounting section 132 in the lower crankcase. The penetrated sections 146 include opposing surfaces 148 facing toward the mounting surface 132 in the lower crankcase, and through holes 150 which define the bolt holes 140. The preform 126 is formed by firing alumina fibers, and the matrix 124 of aluminum alloy penetrates the preform during casting to form a fiber-reinforced metal (FRM) section 152.

In the crankshaft supporter 108, the crankshaft 106 is disposed between the bearing metals 116, 136, and is aligned by inserting a dowel sleeve 154 into the dowel holes 122, 142. By threadedly inserting coupling bolts 156 through the holes 140 and dowel sleeves 154 into the bolt screw holes 120 while contacting the mounting surfaces 118, 138 with each other, the lower crankcase 128 is fixedly mounted to the cylinder block 104 so as to support the crankshaft 106 therebetween. An oil pan (not shown) is mounted to a bottom of the lower crankcase 128.

A crankshaft supporter as disclosed in JP 2000-337348 includes a supporting structure to support a crankshaft in an internal combustion engine, and a holding section to support the support structure, wherein the supporting structure is made of porous material, and material of the holding section flows into pores in the supporting structure.

According to a crankshaft supporter disclosed in JP 2001-71117, a cylindrical preform having a certain volume is set in a cavity in a mold, and molten metal is poured into the cavity so as to cast a cylinder block with the preform embedded therein. The preform has a part, on a side where the molten metal is poured, that is more rigid than the other part.

A crankshaft supporter disclosed in JP 2002-61538 includes: a main body of a cylinder block; a bearing below the main body; a crankshaft rotatably supported by bearing sections that are formed in a lower part of the main body and in a bearing section; aluminum alloy layer in a sliding section of the bearing section; and a composite material around the layer having a lower coefficient of thermal expansion than that of the layer in the sliding section.

In the conventional crankshaft supporter 108 shown in FIGS. 11 and 12, the cylinder block 104 and the lower crankcase 128 are positioned by inserting the dowel 154 into the dowel holes 122, 142 formed in the cylinder block 104 and the lower crankcase 128. When the lower crankcase 128 has the preform 126 cast within the matrix 124 of aluminum alloy, the dowel holes 142 need to be subjected to a cutting process so as to be opened to the mounting surface 134 of the lower case after casting.

At this time, as shown in FIG. 12, not only the matrix 124 but also the FRM section 152 in the lower crankcase 128 needs to be cut after casting to a depth "b" for the dowel, as measured from the mounting surface 138, to form the dowel hole 142 in the lower crankcase. This depth "b" is greater than depth "a" of the matrix, as measured from the mounting surface 138 of the lower crankcase to the opposing surface 148 of the penetrated section 146 of the preform 126. However, the FRM section 152 is rigid (i.e. hard) due to the matrix 124 of aluminum alloy which has penetrated into the preform 126 during casting. The dowel hole 142 is formed by cutting the FRM section 152 that is more rigid (i.e. hard) than the matrix 124 of aluminum alloy after the casting process, which cutting is hard to process and severely wears the blades of the cutting tools.

In order to obviate or minimize the above-mentioned inconvenience, the present invention provides a crankshaft supporter having a support member which is attached to a cylinder block of an engine so as to support a crankshaft and which is formed of a matrix of aluminum alloy with a preform cast inside. The support member includes a mounting surface in contact with a mounting surface on the cylinder block, a bolt hole corresponded to a bolt hole in the cylinder block and opened to the mounting surface of the support member, and a dowel hole in coaxial alignment with the bolt hole and opened to the mounting surface of the support member. In the crankshaft supporter, a penetrated section is formed in the preform and a through hole defining the bolt hole is formed therein, and a recessed section formed of the matrix to shape the dowel hole is positioned between the mounting surface of the support member and an opposing surface of the penetrated section that faces the mounting surface.

According to the present invention, due to the recessed section for shaping the dowel hole made of the matrix and positioned between the mounting surface of the support member and an opposing surface of the penetrated section, only the matrix of aluminum alloy must be cut to permit forming of the dowel hole after casting, which eliminates cutting of the FRM section that is more hard than the aluminum alloy matrix.

DETAILED DESCRIPTION

The invention will initially be described with reference to FIGS. 1–3 which illustrate an embodiment of this invention.

Figure 2:
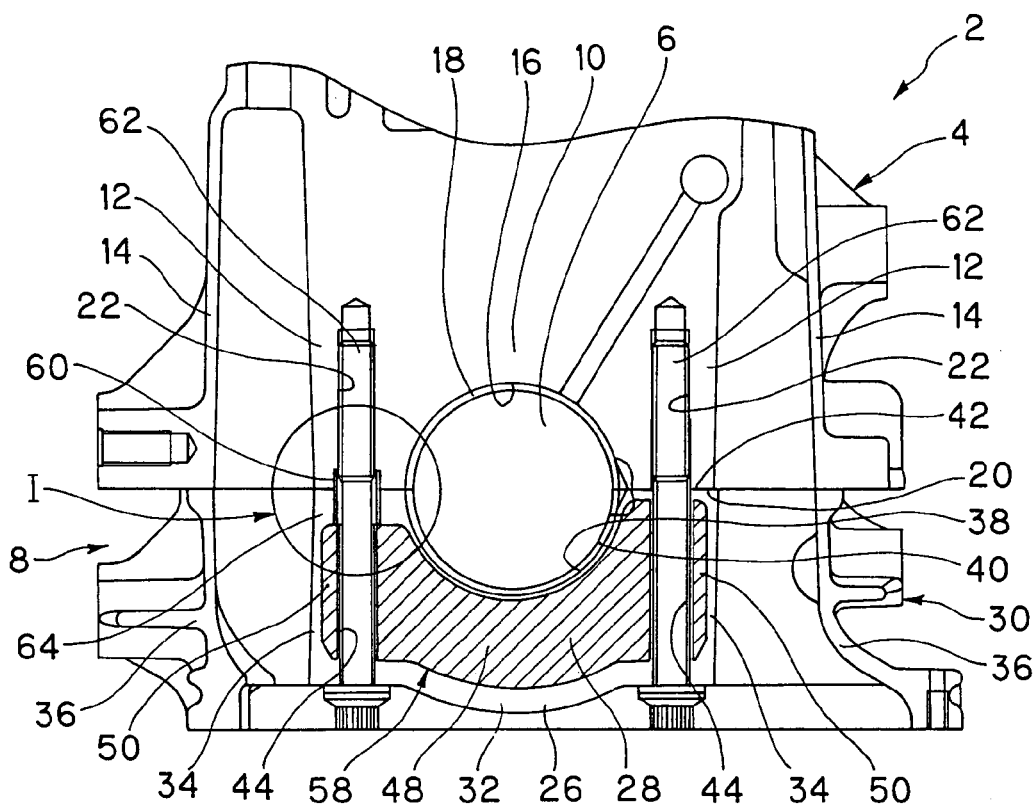
FIG. 2 is a cross-sectional view showing the crankshaft and surroundings of an engine according to the first embodiment.

FIG. 2 shows an engine 2 mounted on a vehicle (not shown), a cylinder block 4 cast of aluminum, a crankshaft 6 made of iron, and a crankshaft supporter 8.

The crankshaft supporter 8 includes, in the cylinder block 4, a bearing section 10, mounting sections 12 adjacent both sides of the bearing section 10, and outer walls 14 outward of the mounting sections 12.

The bearing section 10 in the cylinder block includes a bearing metal 18 on a cylindrical semicircular bearing surface 16. The mounting sections 12 in the cylinder block have bolt screw holes 22 therein which are opened to a mounting surface 20 of the cylinder block. As shown in FIG. 1, the mounting surface 12 defines therein a knock-pin (dowel) hole 24 that opens to the mounting surface 20 in coaxial alignment with the bolt hole 22. The dowel hole 24 in the cylinder block is coaxially aligned with at least one of the bolt holes 22, e.g., the left bolt hole 22 in FIG. 2.

The crankshaft supporter 8 is mounted to the cylinder block 4 of the engine 2 so as to support the crankshaft 6, and includes a lower crankcase 30 that is formed of aluminum alloy as a matrix 26 and that has a preform (core material) 28 cast (embedded) inside.

The lower crankcase 30 includes a bearing section 32 opposed to the bearing section 10 in the cylinder block, mounting sections 34 which are located adjacent both sides of the bearing section 32 and are attached to the mounting sections 12 in the cylinder block, and outer walls 36 outward of the mounting sections 34 that correspond to the outer walls 14 in the cylinder block.

The bearing section 32 in the lower crankcase is equipped with a bearing metal 40 on a cylindrical semicircular bearing surface 38, corresponding to the bearing metal 18 in the cylinder block. The mounting sections 34 in the lower crankcase have bolt holes 44 therein which correspond to the bolt holes 22 and which are opened to a mounting surface 42 of the lower crankcase. As shown in FIG. 1, a dowel hole 46 is defined in coaxial alignment with the bolt hole 44, opening to the mounting surface 42 of the lower crankcase. The dowel hole 46 in the lower crankcase is coaxially aligned with at least one of the bolt holes 44, e.g., the left bolt hole 44 in FIG. 2.

In this way, the lower crankcase 30 includes the mounting surface 42 in contact with the mounting surface 20 in the cylinder block 4, the bolt holes 44 which correspond to the bolt holes 22 in the cylinder block 6 and are opened to the mounting surface 42 of the lower crankcase, and the dowel hole 46 which is aligned with the bolt hole 44 and is opened to the mounting surface 42.

Figure 3:
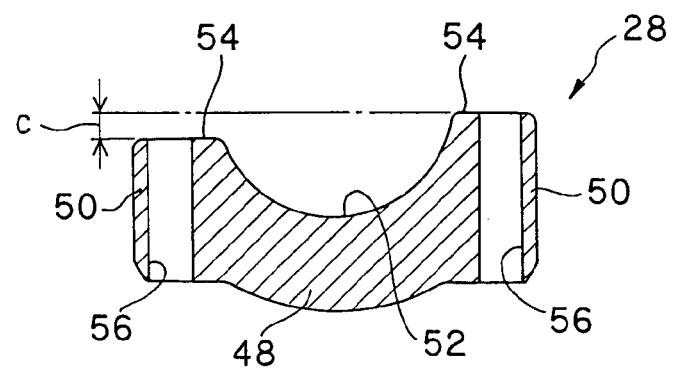
FIG. 3 is a cross-sectional view of a preform of the first embodiment.

As shown in FIG. 3, the preform 28 has a center support section 48 cast in the bearing section 32 in the lower crankcase, and penetrated sections 50 cast in the mounting sections 34 in the lower crankcase at both sides of the support section 48. The support section 48 has a cylindrical semicircular support surface 52 adapted to the bearing section 38 of the lower crankcase. The penetrated sections 50 include opposing surfaces 54 facing the mounting surface 42 of the lower crankcase, and through holes 56 defining the bolt holes 44.

The preform 28 is formed by firing alumina fiber and forms a fiber-reinforced metal (FRM) section 58 by penetrating the matrix 26 of aluminum alloy thereinto during casting.

In the crankshaft supporter 8, the lower crankcase 30 is mounted to the cylinder block 4 by positioning a dowel sleeve 60 therebetween and by threadingly attaching coupling bolts 62 so as to support the crankshaft 6. An oil pan (not shown) is attached to a bottom of the lower crankcase 30.

Figure 1:
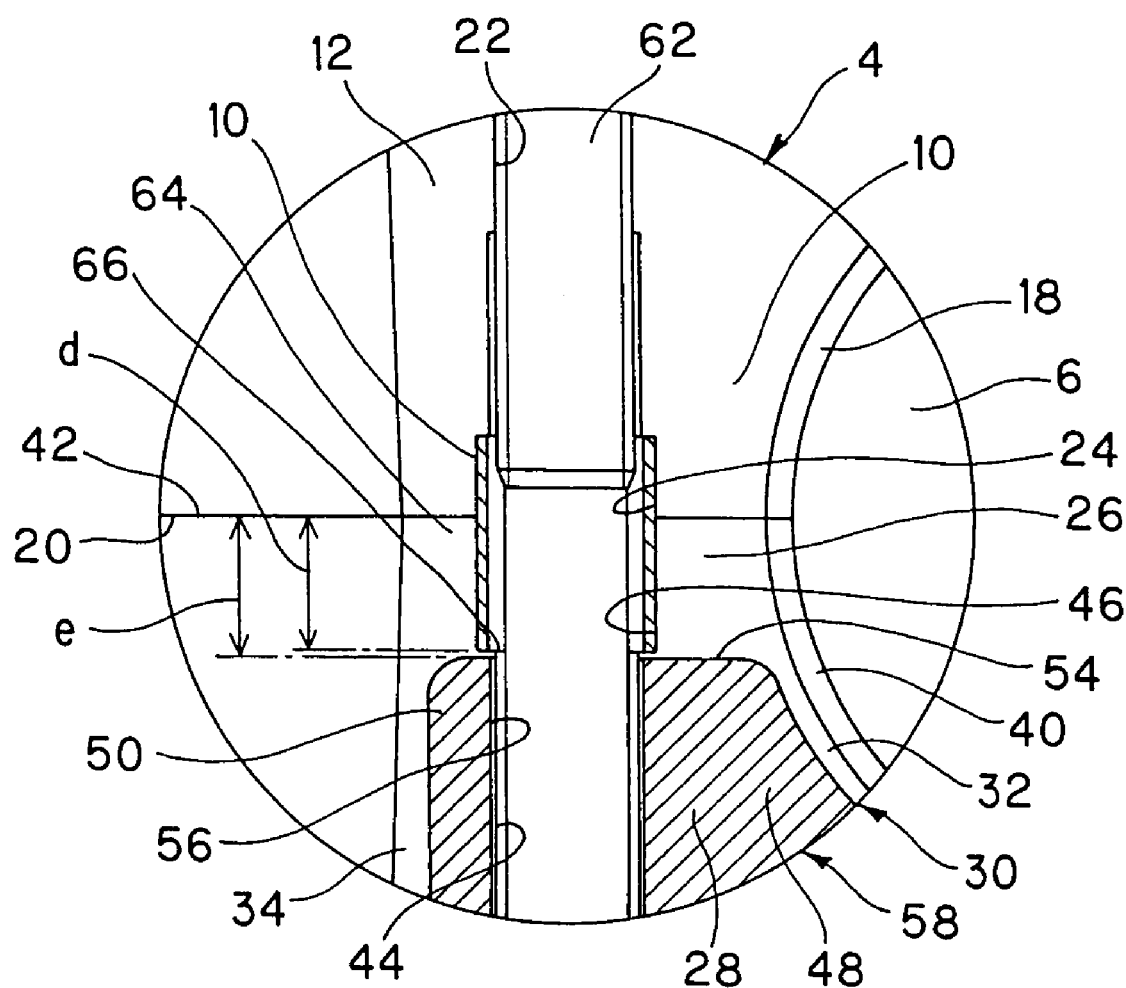
FIG. 1 is an enlarged cross-sectional view of a crankshaft supporter according to a first embodiment and showing the circled region indicated by arrow "I" in FIG. 2.

Referring to FIG. 1, a recessed section 64 to shape the dowel hole and formed of the aluminum alloy matrix 26 is defined between the mounting surface 42 of the lower crankcase 30 and the opposing surface 54 of the penetrated section 50 facing the mounting surface 42.

The lower crankcase 30 includes more than one bolt hole 44. The dowel hole 46 in the lower crankcase is coaxially aligned with one of the bolt holes 44, e.g. the left bolt hole 44 in FIG. 2, and is opened toward the mounting surface 42 of the lower crankcase.

In the lower crankcase 30, the recessed section 64 formed of the matrix 26 is defined between the mounting surface 42 of the lower crankcase 30, where the dowel hole 46 is formed, and the opposing surface 54 of the penetrated section 50 facing the mounting surface 42.

Referring to FIG. 3, the preform 28 includes more than one penetrated section 50 having the through hole 56. At least one opposing surface 54 of the penetrated section 50, e.g., the left opposing surface 54 in FIG. 3, is disposed at a lower position than the other opposing surface 54 by a height "c".

That is, the preform 28 has one opposing surface 54 of the penetrated section 50 formed at a lower position along a depth of the dowel hole 46 so that the recess section 64 formed of the matrix 26 is defined between the mounting surface 42 of the lower crankcase, where the dowel hole 46 is formed, and the opposing surface 54 of the penetrated section 50 facing the mounting surface 42.

Thereby, in the crankshaft supporter 8 shown in FIG. 1, the opposing surface 54 of the penetrated section 50 of the preform 28 is displaced along the depth of the dowel hole 46 so that the depth "e" of the matrix in the recess section 64, as measured from the mounting surface 42 to the opposing surface 54 of the penetrated section 50, is substantially equal to or greater than the depth "d" of the dowel, as measured from the mounting surface 42 of the lower crankcase 30 to a bottom 66 of the dowel hole 46 in the lower crankcase, i.e. d≦e. In this way, the recess section 64 made entirely of matrix 26 is formed between the mounting surface 42 and the opposing surface 54 to permit shaping or forming of the dowel hole 46 therein.

The operation of the above first embodiment is summarized below.

In the crankshaft supporter 8, the crankshaft 6 is disposed between the bearing metals 18, 40, and its position is aligned by inserting the dowel 60 into the dowel holes 24, 46. By threadedly inserting the coupling bolts 62 through the bolt holes 44 into the bolt holes 22 while contacting the mounting surface 20 of the cylinder block with the mounting surface 42 of the lower crankcase, the lower crankcase 30 is mounted to the cylinder block 4 to support the crankshaft 6.

The crankshaft supporter 8 also has the lower crankcase 30 which is attached to the cylinder block 4 for supporting the crankshaft 6 and which has the preform 28 cast therein within the matrix 26 of aluminum alloy. The lower crankcase 30 has a reduced coefficient of thermal expansion by the FRM section 58 having the matrix 26 of aluminum alloy penetrated into the preform 28 made from the fired alumina fiber, which prevents or minimizes expansion of oil clearance and hence reduces noise.

Moreover, in the preform 28, the recess section 64 made of the matrix 26 is defined between the mounting surface 42 of the lower crankcase 30 and the opposing surface 54 of the penetrated section 50 facing the mounting surface 42 so as to permit the dowel hole 46 to be formed or shaped therein. After casting, the dowel hole 46 in the lower crankcase can be shaped by drilling or cutting only the matrix 26 of aluminum alloy as defined by the recess section 64, which eliminates drilling of the FRM section 56 which is harder than the matrix 26.

Accordingly, the crankshaft supporter 8 of this invention permits easier cutting of the dowel hole 46 in a short time, and extends the life of the cutting tools.

In addition, the crankshaft supporter 8 includes the dowel hole 46 in the lower crankcase which is coaxially aligned with the bolt hole 44, e.g. the left bolt hole 44 in FIG. 2, and which is opened toward the mounting surface 42 in the lower crankcase. The recess section 64 made of the matrix 26, provided for shaping the dowel hole 46 therein, is defined between the mounting surface 42 of the lower crankcase, where the dowel hole 46 is formed, and the opposing surface 54 of the penetrated section 50 facing the mounting surface 42.

Accordingly, the recess section 64 can be formed at a part where the dowel hole 46 in the lower crankcase 30 is formed, which enhances a part where the dowel hole 46 is not formed. Casting of such preform 28 contributes to noise reduction.

Further, the preform 28 has one opposing surface 54 of the penetrated section 50 formed at a lower position toward the depth of the dowel hole 46 so that the recessed section 64 formed of the matrix 26 for shaping the dowel hole is defined between the mounting surface 42 of the lower crankcase 30, where the dowel hole 46 is formed, and the opposing surface 54 of the penetrated section 50 facing the mounting surface 42.

Accordingly, the crankshaft supporter 8 simplifies the shape of the opposing surface 54 for the recessed section 64 into a plane, which achieves easier forming of the preform 28.

Figure 4:
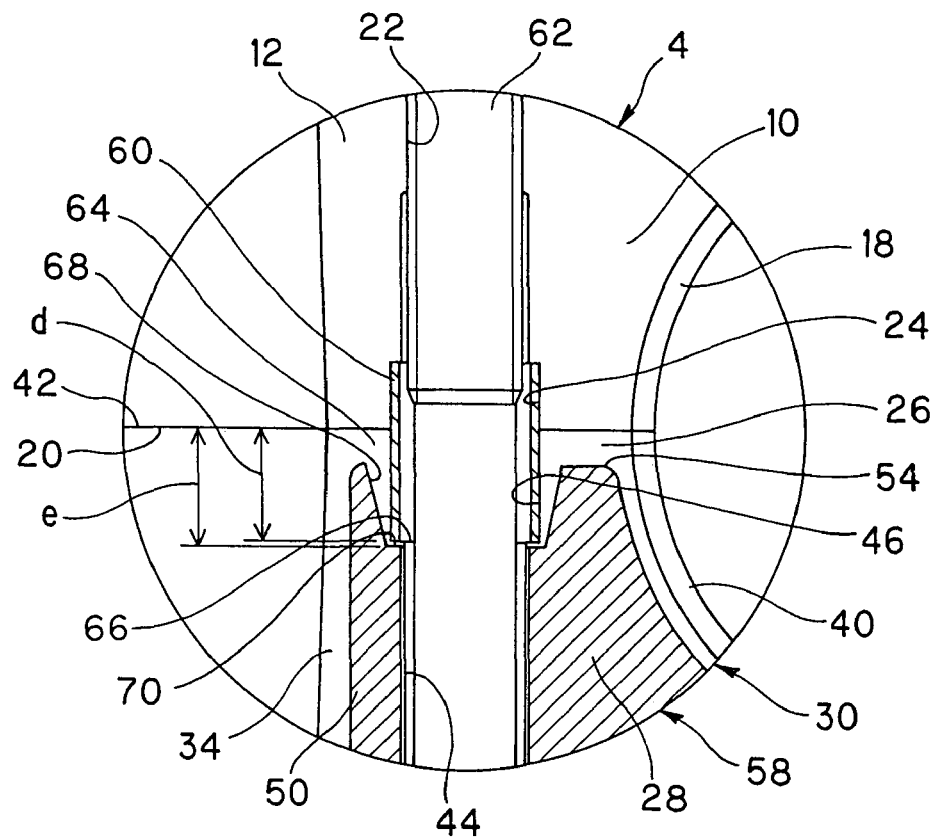
FIG. 4 is an enlarged cross-sectional view of the crankshaft supporter according to a second embodiment.
Figure 5:
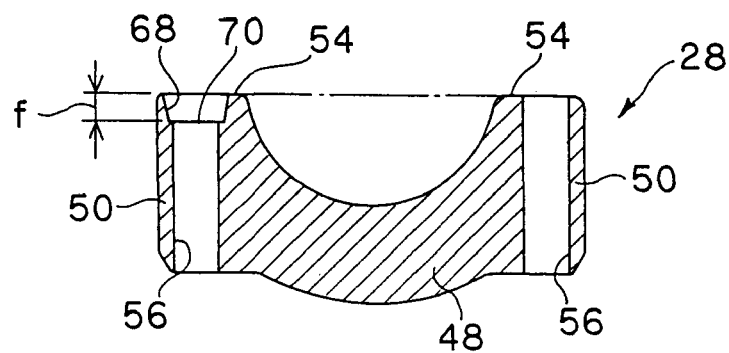
FIG. 5 is a cross-sectional view of the preform of the second embodiment.

FIGS. 4 and 5 illustrate a second embodiment of the invention. According to the crankshaft supporter 8 of the second embodiment, the opposing surfaces 54 having the through holes 56 in the preform 28 are formed to have the same height. The preform 28 includes, in the penetrated section 50 where the dowel hole 46 is formed, a recess or hole 68 which gradually opens toward the opposing surface 54 in aligned and surrounding relationship with the through hole 56. The recess hole 68 has a depth "f" between the opposing surface 54 and the bottom 70.

In the crankshaft supporter 8 as shown in FIG. 4, the recess hole 68 is formed in the preform 28 so that a depth "e" of the matrix, as measured from the mounting surface 42 to the bottom 70 of the recess hole 68, is substantially equal to or greater than depth "d" of the dowel as measured from the mounting surface 42 of the lower crankcase 30 to the bottom 66 of the dowel hole 46 in the lower crankcase, i.e. d≦e. Thereby, the recess section 64 to shape the dowel hole, composed of the matrix 26, is formed between the mounting surface 42 of the lower crankcase 30 and the bottom 70 of the recess hole 68.

Accordingly, the crankshaft supporter 8 of the second embodiment achieves substantially the same effect as that of the first embodiment since the recess section 64 formed of the matrix 26 between the mounting surface 42 and the bottom 70 of the recess hole 68 facilitates shaping of the dowel hole above the penetrated section 50 where the dowel hole 46 is formed.

Also, the crankshaft supporter of the second embodiment includes the opposing surfaces 54 of the penetrated sections 50 of the preform 28 having the same heights, and the recess hole 68 for shaping the dowel hole is formed in the penetrated section 50 only where the dowel hole 46 in the lower crankcase is formed. Accordingly, the recess section 64 can be formed at the part where the dowel hole 46 is formed, which hardly reduces the rigidity of the part where the dowel hole 46 is not formed so as to contribute to noise reduction by casting the preform 28. Also, the recess hole 68 which gradually opens toward the opposing surface 54 permits smooth flow of the matrix 26 of molten metal into the recess hole 68 during casting so as to prevent blowholes, which enhances the combination of the matrix 26 with the preform 28.

Figure 6:
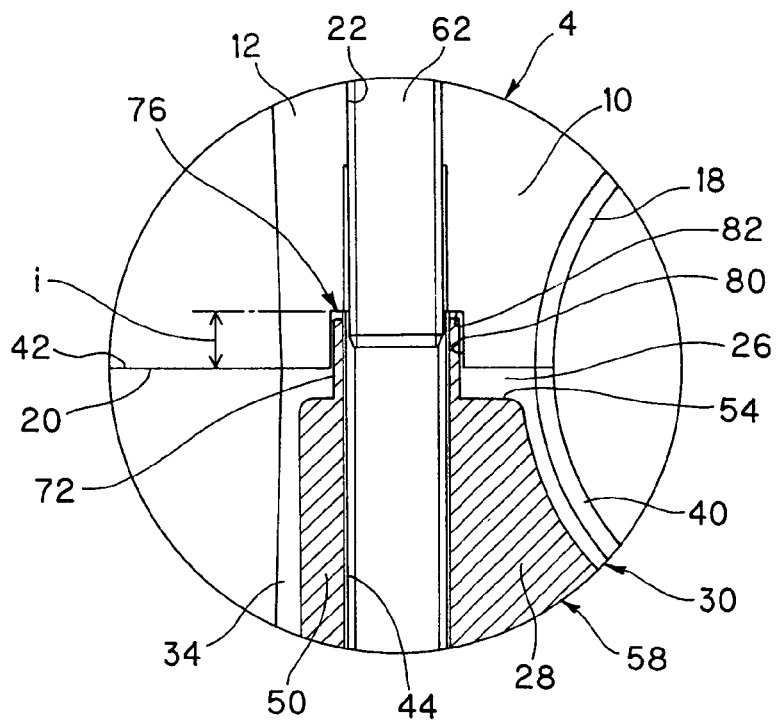
FIG. 6 is an enlarged cross-sectional view of the crankshaft supporter according to a third embodiment.
Figure 7:
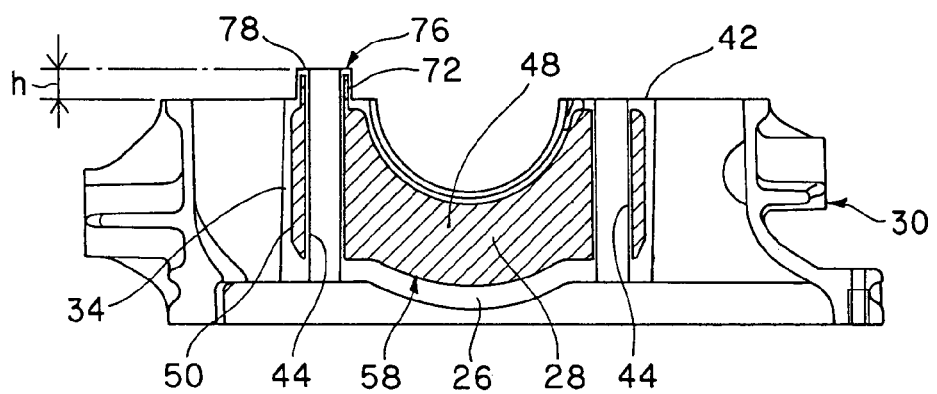
FIG. 7 is a cross-sectional view of a lower crankcase of the third embodiment.
Figure 8:
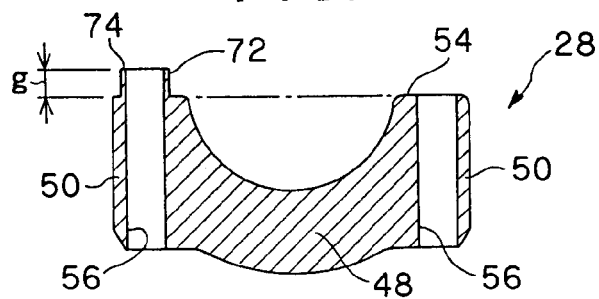
FIG. 8 is a cross-sectional view of the preform of the third embodiment.

FIGS. 6–8 illustrate a third embodiment of the invention. In the crankshaft supporter 8 of the third embodiment, the opposing surfaces 54 on the preform penetrated sections 50 which include the through holes 56 are formed at the same height. A cylindrical protrusion 72 is formed on at least one penetrated section 50, e.g. on the left penetrated section 50 in FIG. 8, and protrudes from the opposing surface 54 in alignment with the through hole 56. The protrusion 72 has a height "g" as measured from the opposing surface 54 to a top end 74 of the protrusion.

As shown in FIG. 7, the mounting section 34 in the lower crankcase 30 includes a cylindrical dowel section 76 made of the aluminum alloy matrix 26, which dowel section 76 protrudes from the mounting surface 42 in alignment with the bolt hole 44 and covers the protrusion 72 of the preform 28. The dowel section 76 has a height "h" measured from the mounting surface 42 to a top end 78 thereof.

As shown in FIG. 6, the mounting section 12 in the cylinder block 4 includes a dowel hole 80 in alignment with the bolt hole 22 and opening downwardly to the mounting surface 20 of the cylinder block. The dowel section 76 is fitted within the dowel hole 80 in the cylinder block. The dowel hole 80 is formed so that a height "i" extending to a bottom 82 thereof is substantially equal to or greater than the height "h" of the dowel section 76, i.e. h≦i.

As described above, the crankshaft supporter 8 of this third embodiment has the dowel section 76 cast in the lower crankcase 30 so that it protrudes from the mounting surface 42 and covers the sleevelike protrusion 72 of the preform. Thereby, after casting, the dowel section 76 can be formed by machining or cutting only the aluminum alloy matrix 26 covering the protrusion 72, which dowel section 76 can then be inserted into the dowel hole 80 in the cylinder block 4. This avoids cutting or drilling into the more rigid FRM section 58 and achieves easier forming of the dowel section 76 and extends the life of the cutting tools.

Also, the crankshaft supporter 8 of the third embodiment includes the opposing surfaces 54 of the preform 28 formed at the same height, and the protruded dowel section 76 on one penetrated section 50. Accordingly, the penetrated sections 50 can have substantially the same rigidity, which contributes to noise reduction by the cast preform 28. Moreover, the dowel section 76 of the preform 28, as cast into the lower crankcase 30, protrudes from the mounting surface 42 so that a separate dowel to mount the lower crankcase 30 to the cylinder block 4 can be eliminated, which reduces the number of parts and number of assembly steps.

Figure 9:
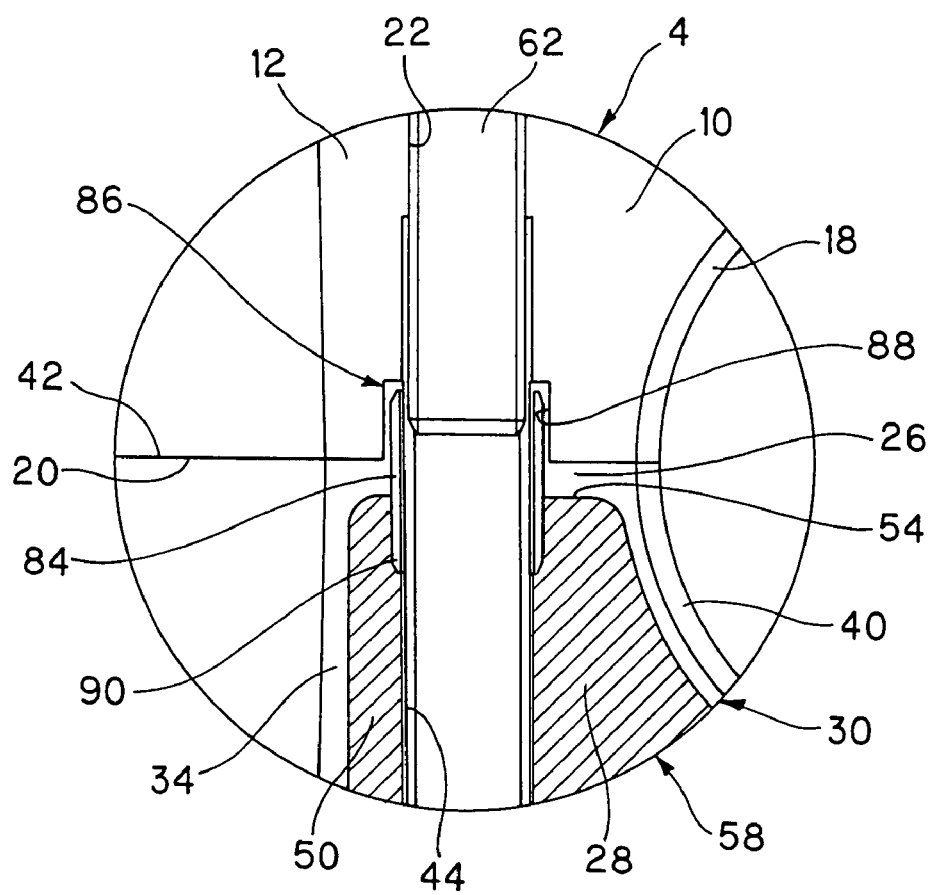
FIG. 9 is an enlarged cross-sectional view of the crankshaft supporter according to a fourth embodiment.
Figure 10:
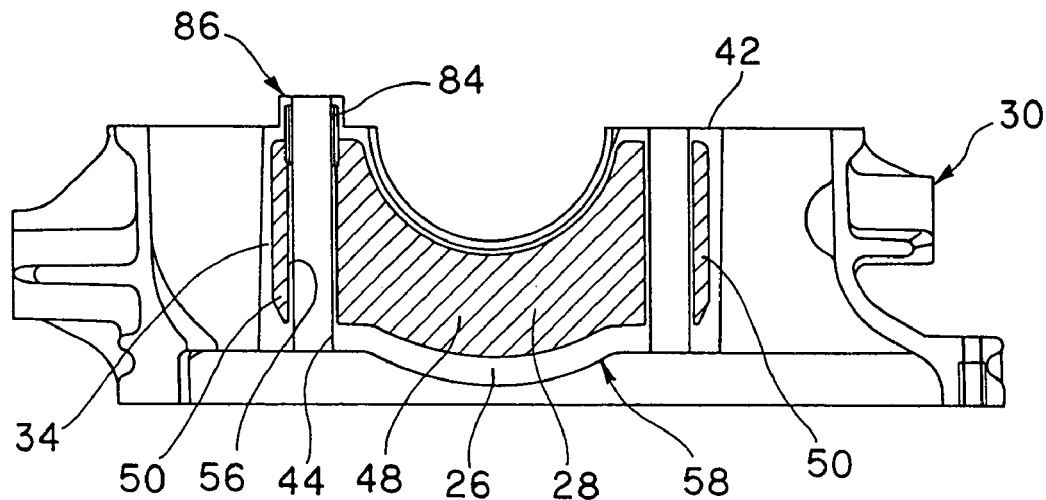
FIG. 10 is a cross-sectional view of the lower crankcase of the fourth embodiment.
Figure 11:
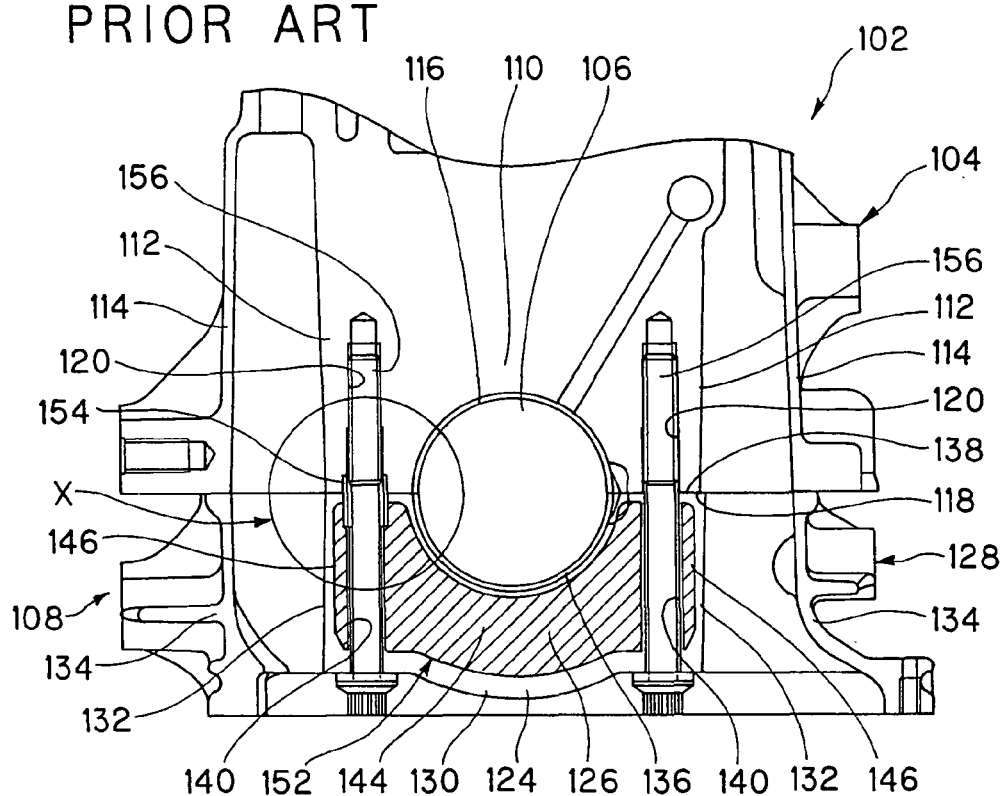
FIG. 11 is a cross-sectional view showing the crankshaft and surroundings of an engine according to the prior art.
Figure 12:
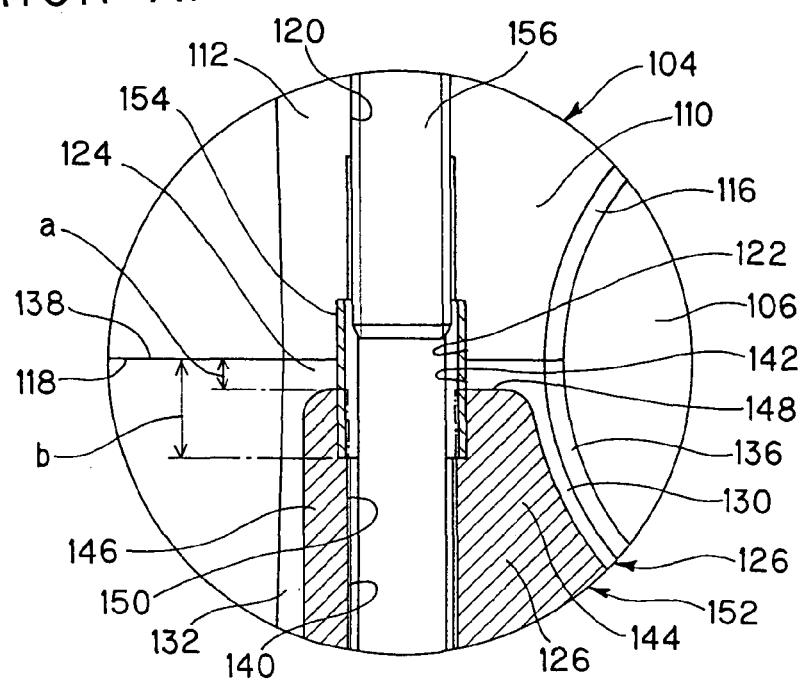
FIG. 12 is an enlarged cross-sectional view showing the circled region indicated by arrow "XII" in FIG. 11.

FIGS. 9 and 10 illustrate a fourth embodiment of the invention. In the crankshaft supporter 8 of the fourth embodiment, as shown in FIG. 10, the opposing surfaces 54 of the preform 28 are formed at the same height, and a forming member or sleeve 84 for the dowel protrudes from the opposing surface 54 coaxial with the through hole 56 associated with the left protruded section 50. In the mounting section 34 in the lower crankcase 30, a cylindrical dowel section 86 is formed of the aluminum alloy matrix 26, which dowel section 86 is coaxial with the bolt hole 44 and covers the forming member 84. As shown in FIG. 9, a dowel hole 88 is defined in the mounting section 12 in the cylinder block 4 and opens downwardly to the mounting surface 20 in coaxial alignment with the bolt hole 22, and in which the dowel section 86 is fitted. A tapered section 90 is provided at a lower end of the sleeve member 84 for easier insertion thereof into the preform 28 in coaxial alignment with the upper end of the respective bolt hole 44.

As thus described, the crankshaft supporter 8 of this fourth embodiment includes the dowel section 86 that protrudes from the mounting section 42 and covers the forming member 84 for defining the dowel of the preform 28 as cast into the lower crankcase 30. The dowel section 86, which is fitted into a dowel hole 94 in the cylinder block 4, can be formed only by machining or cutting the aluminum alloy matrix 26 covering the forming member 84 after casting. This eliminates the cutting of the FRM section 58 that is more rigid than the aluminum alloy matrix 26, which achieves an easier forming process for the dowel section 86 in a short time and extends the life of the blades of the cutting tool.

Also, the crankshaft supporter 8 of the fourth embodiment includes the opposing preform surfaces 54 formed at the same height, and the forming member 84 for the dowel inserted into one penetrated section 50. Accordingly, the penetrated sections 50 can have substantially the same rigidity, which contributes to noise reduction by the cast preform 28. Also, the dowel section 86, in which the member 84 is cast in the lower crankcase 30, protrudes upwardly from the mounting surface 42 which eliminates the assembly step of fitting a separate dowel into the lower crankcase 30.

As thus described, cutting of only the aluminum alloy matrix permits forming of the dowel or dowel hole during the machining process after casting, and eliminates the machining of the FRM section that is harder than the aluminum alloy matrix. The crankshaft supporter thereby permits an easier forming process for the dowel hole or dowel in a short time and extends the life of the cutting tools.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A crankshaft supporter comprising:
   a support member which is attached to a cylinder block of an engine to support a crankshaft and which is formed of a matrix of aluminum alloy with a preform cast inside, said support member having a mounting surface in contact with an attachment surface on said cylinder block;
   a first bolt hole corresponded to a second bolt hole in said cylinder block and opened to said mounting surface;
   a dowel hole in coaxial alignment with said first bolt hole and opened to said mounting surface;
   a support member-side bearing metal on the support member for supporting the crankshaft in cooperation with a cylinder block-side bearing metal on the cylinder block;
   a dowel pin inserted in said dowel hole for positioning the attachment surface on said cylinder block and the mounting surface on the support member side so as to join the cylinder block-side bearing metal with the support member-side bearing metal when mounting the support member to the cylinder block; and
   said support member having a recess section which is formed of said matrix and which is positioned between said mounting surface and an opposing surface of a penetrated section of said preform that faces said mounting surface, said dowel hole being formed entirely within said recess section; and
   wherein the dowel pin has a tip which is inserted into the recess section and is positioned above the opposing surface of the penetrated section of said preform.

2. The crankshaft supporter as defined in claim 1, wherein:
   said support member has a plurality of bolt holes therein; and
   said dowel hole is defined to open to said mounting surface of said support member in coaxial alignment with at least one said bolt hole.

3. The crankshaft supporter as defined in claim 1, wherein said preform has said opposing surface displaced in a depth direction of said dowel hole so that said recess section formed of said matrix is defined between said mounting surface of said support member, where said dowel hole is formed, and said opposing surface of said penetrated section that faces said mounting surface of said support member.

4. The crankshaft supporter as defined in claim 1, wherein:
   said preform includes a center section which defines an arcuate bearing cavity therein, and a pair of said penetrated sections disposed on opposite sides of said center section and each having a said through hole defining a said first bolt hole formed therein;

said recess section and the dowel hole associated therewith being associated with only one of said penetrated sections, the opposing surface of said one penetrated section being spaced downwardly a substantial distance from the mounting surface of the support member so that the depth of the dowel hole formed in the recess section is defined between said mounting surface and the opposing surface of said one penetrated section; and the other said penetrated section having an opposing surface thereon that faces the mounting surface of the support member and is spaced downwardly therefrom by a smaller distance so that the opposing surface on said other penetrated section is at an elevation above the opposing surface on said one penetrated section.

5. The crankshaft supporter as defined in claim 1, wherein:

said preform includes a center section which defines an arcuate bearing cavity therein, and a pair of said penetrated sections disposed on opposite sides of said center section and each having a said through hole defining a said first bolt hole formed therein;

each of said penetrated sections having a said opposing surface thereon which is spaced downwardly a small distance from the mounting surface of the support member, the opposing surfaces on said pair of penetrated sections being at the same height;

said dowel hole being associated solely with one of said penetrated sections, said one penetrated section having an enlarged opening which surrounds the through hole and penetrates coaxially downwardly therealong through a selected distance away from said opposing surface; and the matrix defining said recess section penetrating downwardly and filling said enlarged opening to permit forming of said dowel hole which penetrates downwardly from said mounting surface into the matrix defined in said enlarged opening.

6. The crankshaft supporter as defined in claim 1, wherein said penetrated section of said preform has said first bolt hole penetrating therethrough.

7. The crankshaft supporter as defined in claim 6, wherein said penetrated section has a through hole defining said first bolt hole.

8. The crankshaft supporter as defined in claim 1, wherein said recess section is recessed to define said dowel hole, said dowel hole having an interior hole surface spaced from said preform such that said interior hole surface is defined by said aluminum alloy material disposed outwardly of said preform.

9. The crankshaft supporter as defined in claim 1, wherein the dowel pin has a center opening to permit a bolt in said first bolt hole to pass coaxially therethrough when said support member is attached to said cylinder block.

10. A crankshaft supporter comprising:

a support member which is attached to a cylinder block of an engine to support a crankshaft and which is formed of a matrix of aluminum alloy with a preform cast inside;

said support member having a mounting surface in contact with an attachment surface on said cylinder block, a bolt hole corresponding to a bolt hole in said cylinder block and opened to said mounting surface, and a sleevelike dowel member in coaxial alignment with said bolt hole and protruding outwardly beyond said mounting surface;

said preform having a penetrated section in which a through hole defining said bolt hole is formed;

said dowel section including a sleevelike forming member which is fixed to said preform in coaxial alignment with said bolt hole and which is cantilevered outwardly beyond said mounting surface; and said dowel section having an annular portion which is formed of said matrix and which projects outwardly from said mounting surface in surrounding relationship to said forming member to define a dowel which interfits in an opposed opening formed in said cylinder block.

11. The crankshaft supporter according to claim 10, wherein said forming member is integrally and monolithically joined to said preform and projects coaxially away from said opposing surface so as to penetrate outwardly beyond said mounting surface.

12. The crankshaft supporter as defined in claim 10, wherein said forming member comprises a separate sleeve element which has one end fixed to said preform in coaxial alignment with the through hole, said sleeve element projecting outwardly away from said opposing surface and outwardly beyond said mounting surface.

13. The crankshaft supporter as defined in claim 10, wherein said preform includes a center portion defining an upwardly-oriented concave bearing region, the preform also including a pair of said perforated sections positioned on opposite sides of said center section, each said perforated section having an opposing surface which is spaced downwardly from said mounting surface, the opposing surfaces on said pair of perforated sections being in substantially the same plane.

* * * * *